Sept. 10, 1935.   T. WAUGH, JR   2,014,075
METHOD OF AND APPARATUS FOR SUPPLYING MOLTEN GLASS
Filed April 19, 1933   2 Sheets-Sheet 1

Inventor:
Thomas Waugh, Jr.

Witness:
A. A. Horn.

by Brown & Parham
Attorneys.

Inventor:
Thomas Waugh, Jr.
by Brown & Parham
Attorneys.

Patented Sept. 10, 1935

2,014,075

UNITED STATES PATENT OFFICE 2,014,075

METHOD OF AND APPARATUS FOR SUPPLYING MOLTEN GLASS

Thomas Waugh, Jr., West Hartford, Conn., assignor to Hartford-Empire Company, Hartford, Conn., a corporation of Delaware Application April 19, 1933, Serial No. 666,868

16 Claims. (Cl. 49—56)

This invention relates to methods of, and apparatus for, supplying molten glass and has particular relation to the provision of a pool of glass of proper temperature and viscosity from the surface of which charges are gathered by suction.

In the usual method of gathering glass by suction, the gathering pool is contained in a large rotary pot. This pot is almost entirely covered by a heating chamber to maintain the glass in the proper condition. When the charges are gathered, the molds or gathering receptacles chill the surface of the glass where they contact therewith, and as the charges are severed from the pool, tails or bits are formed thus creating in the pool chilled portions of glass. It is necessary to reheat such chilled portions of glass, and it is also for such a purpose that the heating chamber is provided over the rotary pot. If such chilled glass is not reheated or removed, it contaminates the pool and results in defective glassware.

It has been proposed to employ a stationary container for the gathering pool instead of a rotary pot to eliminate the mechanism required to rotate the pot and to effect other economies in construction and operation, particularly a reduction in fuel consumption. However, the problem of disposing of, or reheating and reconditioning, the chilled glass also exists in the use of the stationary container.

The general object of this invention is to provide a novel method and a novel construction whereby a pool of glass for suction gathering may be more efficiently maintained in a stationary container or forehearth and the chilled glass produced in gathering more adequately reheated and reconditioned than in prior methods and constructions.

More specifically, it is an object of the invention to provide a forehearth and a method for the above purposes, particularly characterized in that the gathering pool is confined to one chamber and is there maintained free of chilled glass by discharging substantially all the chilled glass produced by gathering operations into a separate chamber for reheating. After the proper amount of reheating, the glass may then be returned to the gathering pool. To insure that only properly reheated glass will be so returned, the reheating chamber may be arranged to retain the chilled glass therein while permitting an overflow or escape of hot molten glass therefrom and into the gathering pool. A depression or "trap" may be provided in the reheating chamber to retain the chilled glass therein. The chilled glass, being of higher specific gravity than the hotter glass, sinks into such depression or "trap" and remains therein until reheated and rendered sufficiently molten to "plane off" or rise toward the surface of the pool and overflow or escape therefrom.

In order that the invention may more readily be understood, and other objects and advantages of the invention more fully appreciated, reference should be had to the accompanying drawings, wherein a convenient embodiment of the invention is shown by the employment of which the novel method may be practiced.

In said drawings, Figure 1 is a view in top plan showing a forehearth embodying the invention and broken away to show the interior construction thereof;

Figure 2:
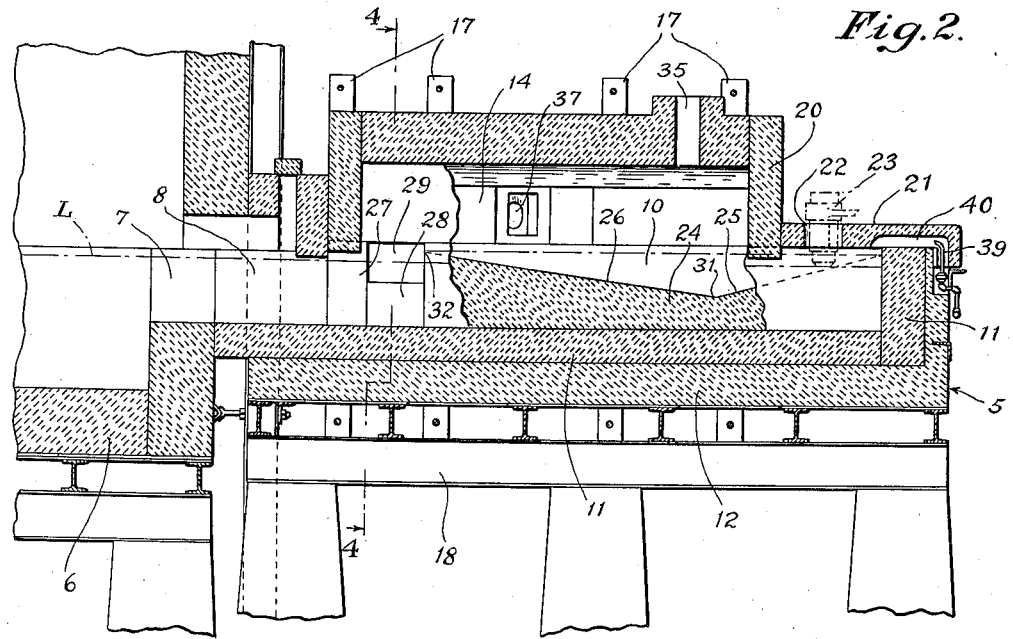
Fig. 2 is a view in vertical longitudinal section taken substantially on the line 2—2 of Fig. 1.

The forehearth shown in the drawings and indicated generally at 5 is connected to the usual type of glass melting tank 6 having an outlet 7 through which glass flows into the inlet passage 8 of the forehearth, Fig. 2.

Figure 1:
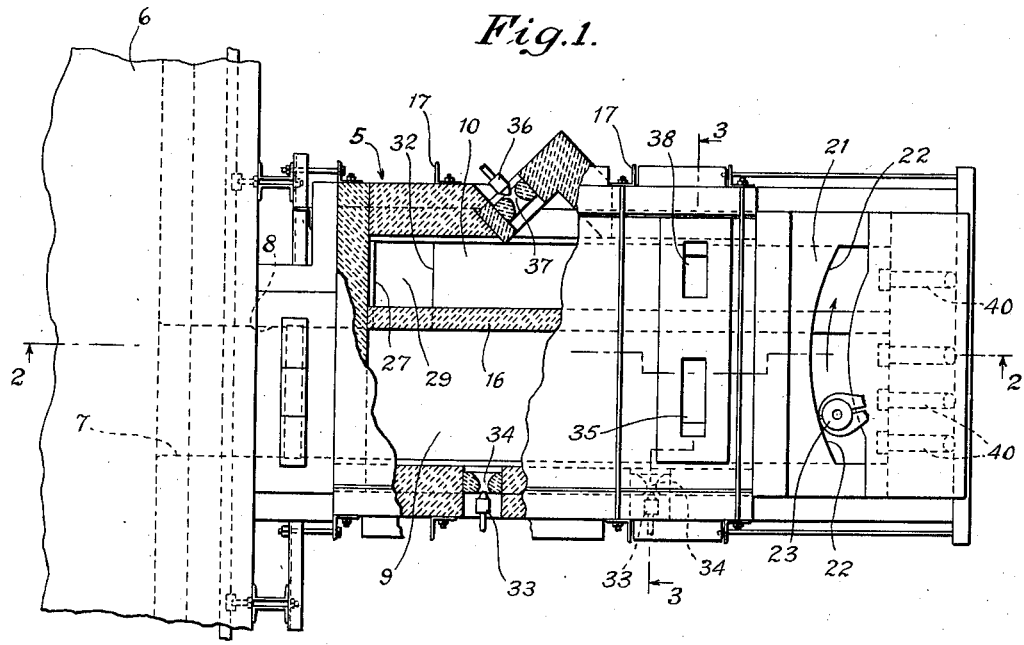

The forehearth 5 comprises a chamber 9, Fig. 1, containing the gathering pool and into which glass flows through the inlet 8. Adjacent to the chamber 9 is a reheating or reconditioning chamber 10 into which chilled glass produced by the gathering operations is delivered to be restored to working condition.

Figure 3:
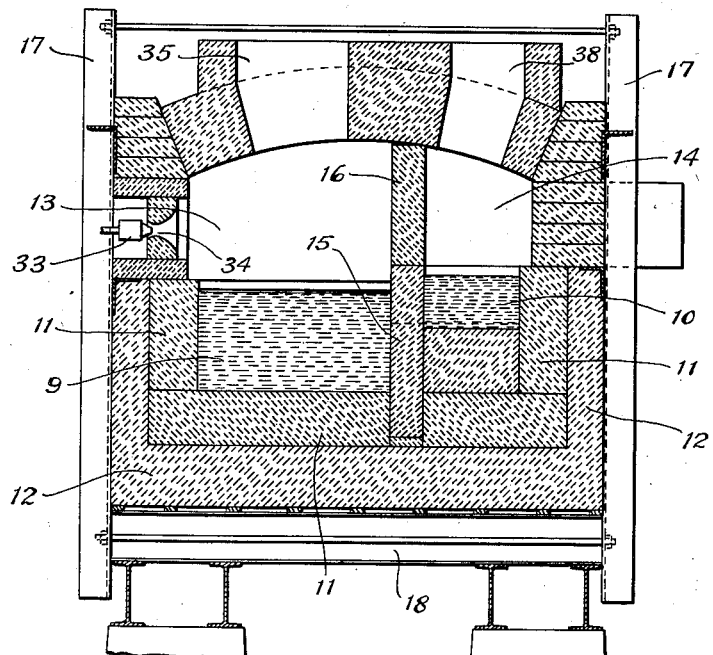
Fig. 3 is a view in vertical transverse section taken substantially on the line 3—3 of Fig. 1.
Figure 4:
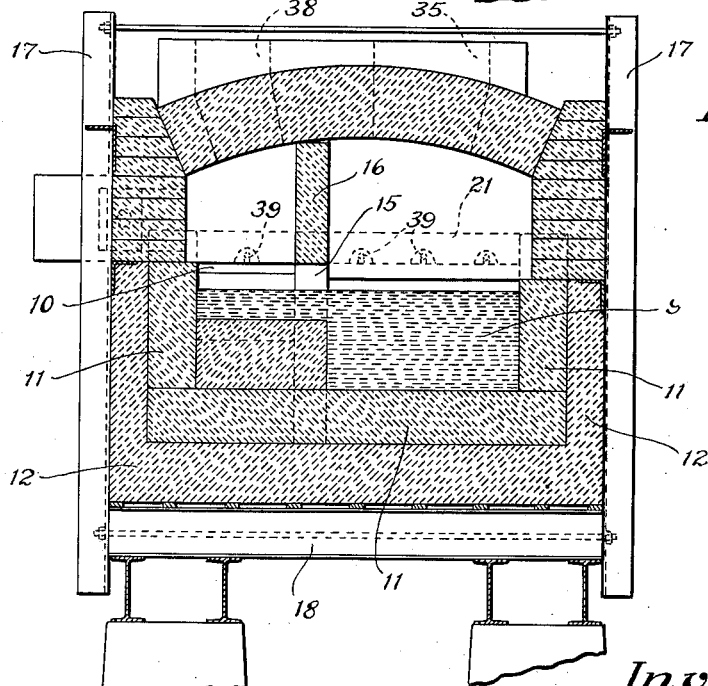
Fig. 4 is a similar view taken subsantially on the line 4—4 of Fig. 2.

These two chambers 9 and 10 are lined with flux blocks 11 which are backed by insulation 12. Combustion spaces 13 and 14, which respectively overlie and form parts of the glass gathering chamber 9 and the glass reheating chamber 10, are formed by suitable refractory material forming the side walls and crown or roof thereof. The chambers 9 and 10 are separated by a vertical longitudinal wall 15 set in bottom blocks 11, and reaching to above the glass line in chamber 10. This wall separates the glass in chamber 10 from that in chamber 9, and it is extended above the glass line at 16 to separate the combustion spaces 13 and 14 previously mentioned. The wall 15—16 thus provided may be off-set with respect to the longitudinal center line of the forehearth, as shown in Figs. 1, 3, and 4, so that the chamber 9 will be considerably wider than the chamber 10. However, the relative widths of the two chambers may be varied as desired.

The refractory parts of the forehearth, both below and above the glass line may be held together by means of buck-stays, such as shown at 17, which are loosened or tightened as the forehearth is heated or cooled. The forehearth may be supported by a metal frame-work indicated at 18, carried by suitable piers or other foundation.

As shown in Figs. 1 and 2, the combustion spaces do not extend entirely to the front of the forehearth, but end in the front wall 20 located at the proper distance to the rear of the forehearth for convenient access of the molds of a glassware forming machine to the surface of the glass in chamber 9. The front of the forehearth thus left unobstructed is enclosed by a cover 21 provided with an arcuate slot 22 through which the molds or gathering receptacles of a suction machine may be dipped to gather charges. One of such molds is indicated at 23, Figs. 1 and 2. The slot 22 not only overlies the forward portion of the chamber 9, hereinafter referred to as the "gathering zone", but also overlies the forward portion of the heating chamber 10, later referred to as the "severing zone".

The bottom 24 of the heating chamber 10 is formed of suitable refractory material or blocks built up above the level of the bottom of the chamber, as shown in Fig. 1. This bottom is inclined downwardly and rearwardly from the front of the forehearth, as shown at 25, to a point located beneath the combustion space or chamber 14. From this point, the bottom slopes very gradually upwardly and rearwardly, as shown at 26, to where it forms, together with the rear wall portion 27 and a suitable filler block 28 (see Figs. 1 and 2), a transverse channel 29 which opens into the rear of chamber 9.

The inclined bottom portions 25 and 26 of the chamber 10 provide a depression at 31 for the purpose of confining chilled glass to the heating chamber. When the chilled glass has been sufficiently heated, it may flow rearwardly over the terminal edge portion or weir 32 of the bottom portion 26 of the reheating chamber (see Figs. 1 and 2) and into channel 29 for return to chamber 9.

In order to maintain the glass in chamber 9 at the desired working temperature, suitable burners may be provided, as shown at 33 (Figs. 1 and 3). These burners may be set to direct their flames transversely of the chamber 9 through ports 34 with which they are associated. The gases of combustion may flow out of combustion space 13 through a stack 35 in the crown of the forehearth.

Similarly, the reheating chamber may be maintained at the desired temperature for reheating chilled glass therein by means of a burner 36 which directs its flame through a port 37, preferably set at an angle, as shown for example in Fig. 1, to direct the flame toward the front of the chamber where the chilled glass enters the chamber, and particularly toward the depression 31. The gases of combustion from burner 36 may leave the reheating chamber through a stack 38 and the escape of such gases, and the escape of gases through stack 35 may be controlled by suitable dampers, not shown.

The heating of the chambers by the means above described may be supplemented to greater or less extent by burners 39 associated with substantially horizontal ports 40 in the front part of the cover 21 of the forehearth. The flames from such burners may serve to maintain the glass adjacent the front wall in the best condition for suction gathering, preventing the formation of a layer of chilled glass of sufficient thickness to contaminate the glass in the gathering zone.

In the performance of the novel method of the invention, the glass in the tank 6 and in the gathering chamber 9 is preferably maintained at a level indicated by the dot-and-dash line L, Fig. 2, and as shown by the level of the glass in Figs. 3 and 4. In gathering charges, the suction molds are moved in the direction of the arrow, Fig. 1, that is, from the chamber 9 to the reheating chamber 10. As the mold is charged and is raised from the surface of the glass in chamber 9, the tail connecting the charge with the glass in the pool is drawn across that portion of the wall 15 laying beneath the slot 22. The tail is thus removed from the gathering zone in chamber 9 to the severing zone in the reheating chamber, whereupon the tail is severed from the charge in the usual manner (not shown) and left in the reheating chamber to be heated therein.

The chilled glass thus, or otherwise, formed and delivered to the reheating chamber eventually may find its way down the inclined bottom 25 into the lower portion or depression 31 in the bottom of the reheating chamber. As such glass passes under front wall 20, the flame from burner 30 36 plays thereon restoring its high temperature and fluidity. This may occur very quickly because the reheating chamber is relatively shallow. When sufficient glass has accumulated, the hot fluid glass will flow over weir 32 into channel 29 and thence into chamber 9. The depression 31 tends to hold or trap the chilled glass in the chamber 10 because such glass sinks due to its higher specific gravity. This facilitates "planing off" of hot relatively fluid glass from the chilled or cooler glass. The depression 31, moreover, causes the accumulation of the chilled glass at the forward part of the chamber 10, this being the hottest part of the chamber because burner 36 is set to play thereon. Such location of the depression 31 and the "hot spot" affords the maximum period in which the glass may homogenize as it moves toward the chamber 9.

The gradual upward slope of the bottom portion 26 causes an increasing shallowness of the glass toward the rear of the forehearth. This insures that the glass will be heated and homogenized with increasing effectiveness as it nears the weir 32 and results in more rapid "planing off" of glass of high temperature and fluidity.

By delivering the reheated glass to the chamber 9 at the rearmost part thereof, ample time is afforded for the reheated glass to homogenize with fresh glass entering through inlet channel 8. Should insufficiently reheated glass be returned to chamber 9, such glass will be reheated by the time it travels nearly the full-length of the forehearth to the gathering zone. However, it is preferred to guard against this by maintaining a sufficiently high temperature in reheating chamber 10.

It will be understood from Figs. 2, 3 and 4 that the level of the pool in chamber 10 is higher than that in chamber 9. It is preferred to maintain this relation of the levels of the two pools at all times to keep them separated, otherwise the chilled glass might contaminate the glass in the gathering pool. Moreover, by establishing and maintaining the glass level in the reheating chamber 10 above that in chamber 9, the reheated glass can be returned to the gathering pool by gravity alone.

By maintaining the proper temperature conditions in the chambers 9 and 10, glass of the best properties for suction gathering may be had in the gathering zone at all times. The two chambers are separated sufficiently well to permit the temperature of one to be regulated independently of the temperature of the other. The temperature in chamber 10 usually is maintained higher than that in chamber 9 to insure that all chilled glass is reheated at least to the gathering temperature and preferably higher.

The novel method and construction of this invention are adapted for use with the "fill and empty" method of forming hollow glassware. When so used the molds may be charged by suction in the gathering zone of chamber 9 in the usual way and then moved into the severing zone of chamber 10 for the "empty" operation. After glass is expelled by the "empty" operation, severing occurs and the emptied glass and severed tail, thus introduced to the severing zone, are reheated in chamber 10 as above explained. The "fill and empty" method forms no part per se of the present invention, and hence need not be further described. It is disclosed in French Patent 731,173, granted February 8, 1932 to the Hartford-Empire Company.

Variations may be made in the steps of the method and in the combination, arrangement, and character of parts in the apparatus, without departing from the scope of the appended claims.

Having thus described my invention, what I desire to claim and secure by Letters Patent is:

1. The method of maintaining a pool of glass, from the surface of which charges are gathered in a gathering zone by suction receptacles, in the proper condition for such gathering which comprises, moving the receptacles from above the pool after the charges are gathered therein, severing the tails of chilled glass formed in gathering so as to deliver them to a chamber in which such chilled glass is kept confined and wholly separated from the gathering pool, subjecting the chilled glass to high temperature in said chamber to restore heat and fluidity thereto, and returning it to the gathering pool after its fluidity is restored without returning such glass to the furnace which supplies glass to the pool.

2. The method of maintaining a pool of glass from which charges of glass are gathered by suction, in the proper condition for suction gathering, which comprises delivering substantially all the chilled glass formed in gathering the charges and in severing to a reheating chamber by moving the gathering receptacle from over the gathering pool to a position over said chamber prior to severing and thereupon disconnecting the tail from the charge, confining such chilled glass to said chamber and maintaining separation thereof from the gathering pool, subjecting the chilled glass to a predetermined high temperature in said chamber to restore heat and fluidity thereto, planing off hot fluid glass from chilled glass in said chamber and returning it to the gathering pool without returning it to the furnace which supplies glass to the pool, and controlling the temperature of the gathering pool independently of the temperature condition in said chamber.

3. A forehearth for suction gathering comprising a first chamber for a pool of glass from the surface of which charges are gathered by suction receptacles, and a second reheating chamber in said forehearth adjoining the first chamber into which chilled glass formed in gathering and severing is delivered for reheating, and means for preventing the delivery of glass other than said chilled glass to said second chamber whereby said chilled glass can be reheated independently of such other glass.

4. A forehearth for suction gathering comprising a first chamber for a pool of glass from the surface of which charges are gathered by suction receptacles, a second reheating chamber in said forehearth adjoining the first chamber into which chilled glass formed in gathering and severing is delivered for reheating, and means for preventing the delivery of glass other than said chilled glass to said second chamber whereby said chilled glass can be reheated independently of such other glass, and combustion spaces individual to said chambers.

5. A forehearth for suction gathering comprising a first chamber for a pool of glass from the surface of which charges are gathered by suction receptacles, a second reheating chamber in said forehearth adjoining the first chamber into which chilled glass formed in gathering and severing is delivered for reheating, and means for preventing the delivery of glass other than said chilled glass to said second chamber whereby said chilled glass can be reheated independently of such other glass, combustion spaces individual to said chambers, and means associated with the respective chambers for independently regulating the temperature conditions in the said chambers.

6. A forehearth for suction gathering comprising a first chamber for a pool of glass from the surface of which charges are gathered by suction receptacles, a second reheating chamber in said forehearth adjoining the first chamber into which chilled glass formed in gathering and severing is delivered for reheating, and means for preventing the delivery of glass other than said chilled glass to said second chamber whereby said chilled glass can be reheated independently of such other glass, said reheating chamber lying parallel to the first chamber, and the glass containing portion of the second chamber being at a higher level than the first chamber whereby glass may flow by gravity from the second chamber toward the first chamber.

7. A forehearth for suction gathering comprising a first chamber for a pool of glass from the surface of which charges are gathered by suction receptacles, a second reheating chamber in said forehearth adjoining the first chamber into which chilled glass formed in gathering and severing is delivered for reheating, and means for preventing the delivery of glass other than said chilled glass to said second chamber whereby said chilled glass can be reheated independently of such other glass, said reheating chamber lying parallel to the first chamber, the glass containing portion thereof being at a higher level than the first chamber whereby glass may flow by gravity from the second chamber toward the first chamber, and said glass containing portion of the forehearth in a terminating rearwardly of the forehearth in a weir over which glass may flow by gravity toward the first chamber.

8. A forehearth for suction gathering comprising a first chamber for a pool of glass from the surface of which charges are gathered by suction receptacles, a second reheating chamber adjoining the first chamber into which chilled glass formed in gathering and severing is delivered for reheating, said chambers being separated by a partition which extends at least from the bottom of the first chamber to above the glass line in the second chamber, said second chamber comprising a relatively shallow glass containing portion the bottom of which slopes rearwardly and downwardly and thence is inclined upwardly and forms a weir at its innermost end portion over which glass may flow.

9. A forehearth for suction gathering comprising a first chamber for a pool of glass from the surface of which charges are gathered by suction receptacles, a second reheating chamber adjoining the first chamber into which chilled glass formed in gathering and severing is delivered for reheating, said chambers being separated by a partition which extends at least from the bottom of the first chamber to above the glass line in the second chamber, and from the front wall of the forehearth rearwardly at least to the inner end of said second chamber, the forward portion of said forehearth being so arranged that a gathering receptacle may move across the forward portions of the two chambers, and a channel for receiving glass from the reheating chamber and delivering it to the first chamber.

10. The method of maintaining a pool of glass from the surface of which charges are gathered in a gathering zone by suction receptacles in the proper condition for suction gathering which comprises, removing chilled glass formed by the gathering operations from the gathering pool as it is formed and before substantial admixture thereof with the glass in the pool, collecting the chilled glass in an independent reheating pool, heating the glass in said independent reheating pool to working temperature and returning directly to said gathering pool such glass as is restored to working temperature in said reheating pool while confining the remaining chilled glass to said reheating pool.

11. A forehearth for suction gathering containing a first chamber adapted to contain a gathering pool, and arranged at its forward end portion for the dipping of a gathering implement into said pool to gather charges of glass, and a second chamber for reheating chilled glass formed by the gathering operation of said implement, and adapted for the delivery to the forward end portion thereof of such chilled glass by said implement, said forehearth comprising means so constructed and arranged as to prevent the flow of glass from the forward end portion of either chamber into the forward end portion of the other chamber, and means associated with said second chamber for reheating chilled glass therein.

12. A forehearth for suction gathering containing a first chamber adapted to contain a gathering pool, and arranged at its forward end portion for the dipping of a suction receptacle into said pool to gather charges of glass, and a second chamber for reheating chilled glass formed by the gathering operations of said receptacle, and adapted for the delivery to the forward end portion thereof of such chilled glass by said receptacle, said forehearth comprising means so constructed and arranged as to prevent the flow of glass from the forward end portion of either chamber into the forward end portion of the other chamber, means for heating the glass in the first chamber, and means independent of the last-named means for heating glass in the second chamber whereby a higher temperature can be maintained in the second chamber than the working temperature in the first chamber.

13. A forehearth for suction gathering containing a first chamber adapted to contain a gathering pool and arranged at its forward end portion for the dipping of a suction receptacle into said pool to gather charges of glass, and a second chamber for reheating chilled glass formed by the gathering operations of said receptacle, and adapted for the delivery to the forward end portion thereof of such chilled glass by said receptacle, said forehearth comprising means so constructed and arranged as to prevent the flow of glass from the forward end portion of either chamber into the forward end portion of the other chamber, and a channel in said forehearth for conducting reheated glass from the rear end of said second chamber directly to the rear end portion of said first chamber.

14. A forehearth for suction gathering containing a first chamber adapted to contain a gathering pool, and arranged at its forward end portion for the dipping of a suction receptacle into said pool to gather charges of glass, and a second chamber for reheating chilled glass formed by the gathering operations of said receptacle, and adapted for the delivery to the forward end portion thereof of such chilled glass by said receptacle, said forehearth comprising means so constructed and arranged as to prevent the flow of glass from the forward end portion of either chamber into the forward end portion of the other chamber, means for heating the glass in the first chamber, means independent of the last-named means for heating glass in the second chamber whereby a higher temperature can be maintained in the second chamber than the working temperature in the first chamber, and a channel in said forehearth for conducting reheated glass from the rear end of said second chamber directly to the rear end portion of said first chamber.

15. A forehearth for suction gathering containing a gathering chamber and a reheating chamber for reheating chilled glass formed in the gathering operations, the glass confining portions of said reheating chamber being at a higher level than those of the gathering chamber and being adapted to completely isolate a pool of glass in the reheating chamber from the glass in the gathering chamber, said forehearth comprising a channel for conducting reheated glass from said reheating chamber directly to said gathering chamber.

16. A forehearth for suction gathering divided longitudinally to provide a gathering chamber and a reheating chamber arranged side by side, the forward portions of said chambers being so arranged as to provide for the gathering of charges by a suction receptacle from a pool in the gathering chamber, and the delivery by said receptacle to the reheating chamber of chilled glass formed in the gathering operations, said forehearth comprising means for isolating the chilled glass in said reheating chamber, and means for reheating the glass therein.

THOMAS WAUGH, Jr.